3,756,910
FRICTION MATERIAL AND METHOD
OF MANUFACTURE
Walter B. Peters, South Orange, and Irvin Barnett, Martinsville, N.J., assignors to Johns-Manville Corporation, New York, N.Y.
Filed June 24, 1971, Ser. No. 156,267
Int. Cl. B44d 1/02; C03c 25/00
U.S. Cl. 156—166                                    2 Claims

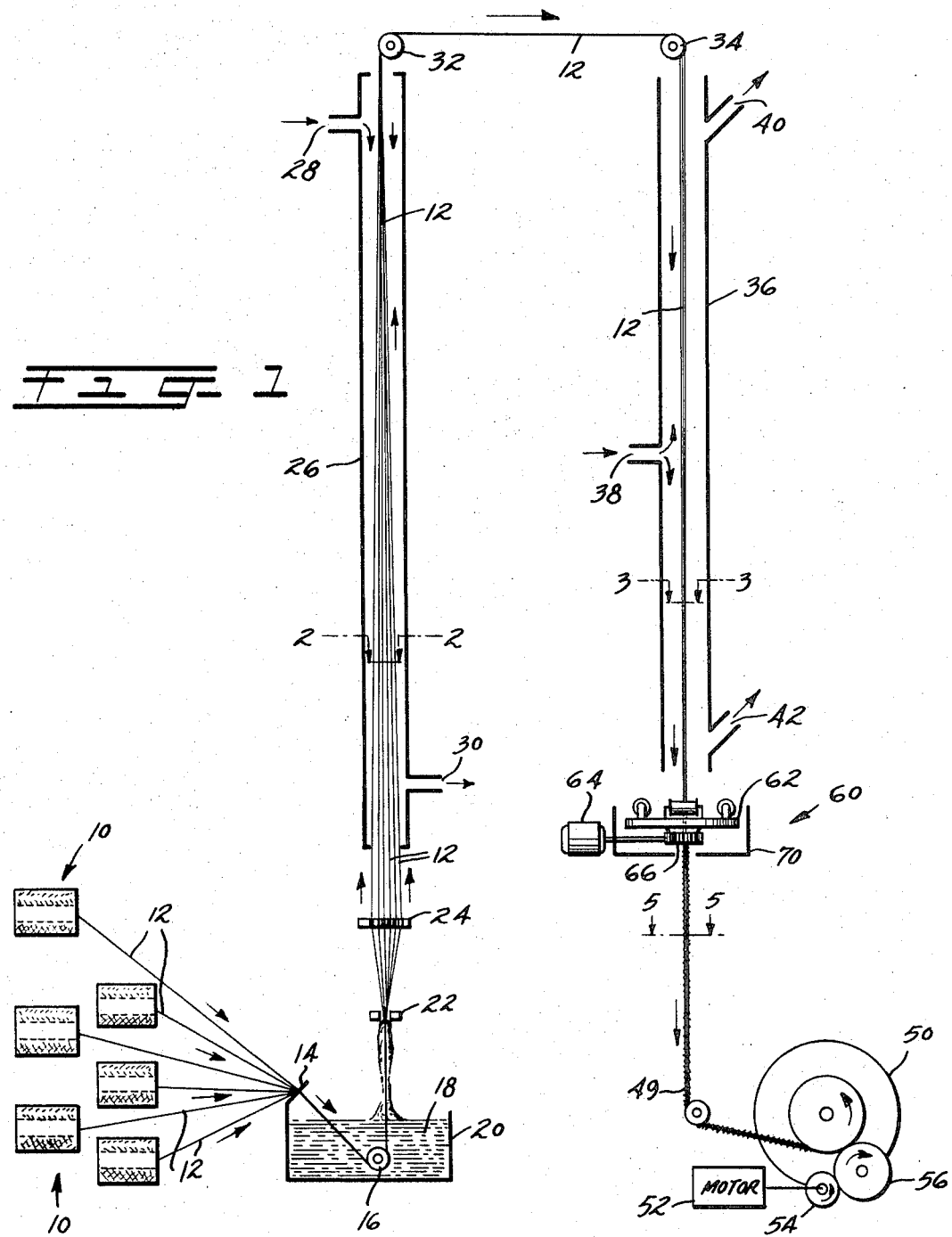

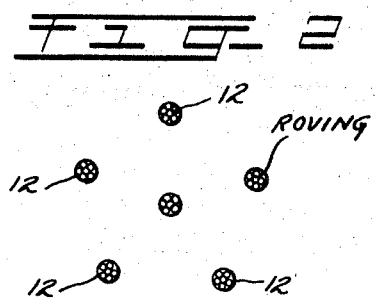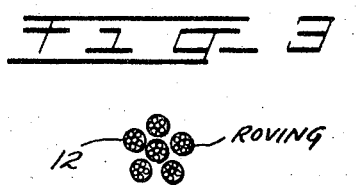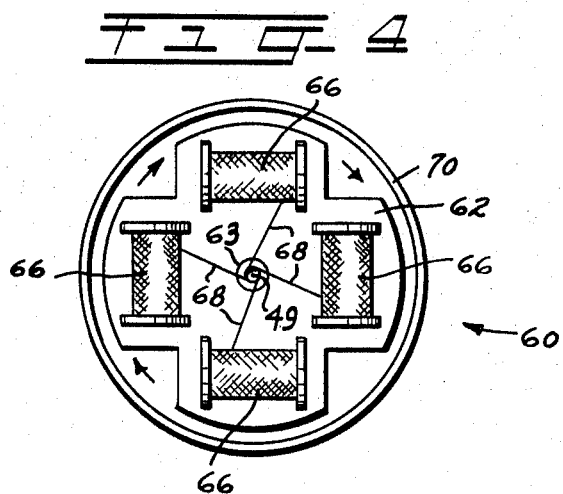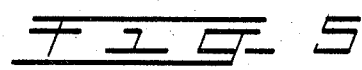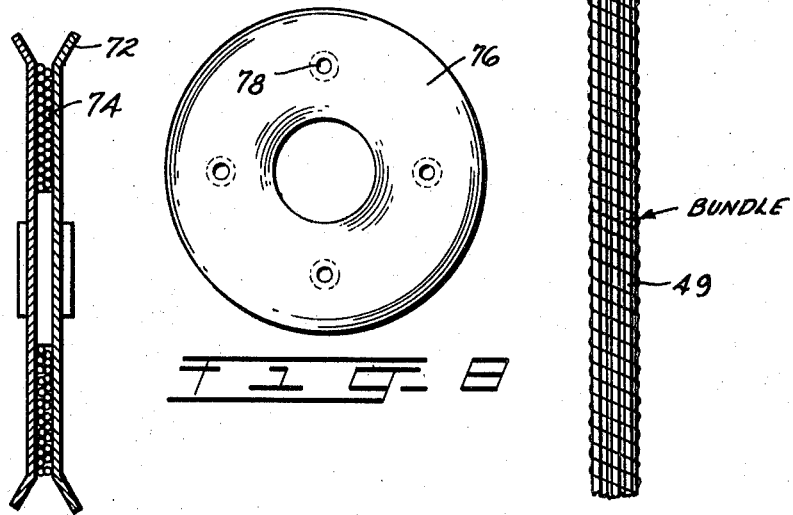

ABSTRACT OF THE DISCLOSURE

Article and method of preparing continuous glass fibers into a continuous bundle for use in forming friction clutch facings. Plural rovings (each containing many thousand individual continuous glass filaments) are impregnated in a cement bath, and, after partial drying, are collected and contained in a continuous bundle by helically wrapping with a soft metal wire. Thereafter the bundles are adapted to be spirally wound upon themselves into disc-like forms and cured under heat and pressure to define a friction clutch facing.

BACKGROUND OF THE INVENTION

The prior art contains many showings of asbestos fibers in clutch and friction material. Asbestos fibers contain many of the basic characteristics desirable for use in friction materials. Some of these are:

(1) Wetability for adhesion to binder matrix.
(2) Wood friction material because:
  (a) Heat stable.
  (b) Hardness range generally below that of steel, therefore will not score metal friction facings.
  (c) Desirable coefficient of friction.
  (d) Fine fibrils on asbestos fibers that stabilize and reinforce the matrix.

Asbestos fibers combined with cotton fibers (or synthetic fibers) with appropriate cement have proven to be a good friction material for average service. Brass wires or metal particles have long been used in the friction material, primarily to dissipate heat. The formulas for clutch and brake materials including cements are numerous in varying combinations. As demands for greater spin strengths (resistance to centrifugal forces) increased, various arrangements were proposed. These included metal backing plates to which the actual friction material is bonded. Backing plates have also been formed of laminated glass cloth with asbestos and other fibers and cement as the friction material. The glass fibers were present primarily for strength and not as a friction material.

As clutch requirements became more demanding, glass fibers began to appear in the prior art. U.S. Pat. No. 3,270,846, H. F. Arledter et al., issued Sept. 6, 1966, disclosed the use of up to 27 percent glass fibers with other materials to form a friction facing for use in wet clutches which run in oil or other fluids. The specification does not clearly teach in what manner these fibers are incorporated with the other ingredients which, of course, include asbestos fibers. Prior thereto U.S. Pat. No. 3,068,131, H. C. Morton, issued Dec. 11, 1962, had disclosed the use of plies of flat woven spun glass fabric in the reinforcing ring for supporting clutch facing material. Note that asbestos fibers, and not glass, were present in the actual friction material. U.S. Pat. No. 3,365,041, R. W. Stormfeltz, issued Jan. 23, 1968, disclosed a reinforcing ring 11 of glass cloth and cement sandwiched between rings of friction elements 10 comprised of 75 percent asbestos fibers plus other materials (not glass) and cement. Note that glass was for spin strength and other reinforcement while asbestos fibers and brass wires were for frictional engagement. U.S. Pat. No. 3,429,766, R. W. Stormfeltz, issued Feb. 25, 1969, disclosed the use of a clutch facing of spirally wound multi-ply strips of asbestos fibers, metallic wire and cement reinforced by woven glass fabric. By an inspection of FIG. 3 it is apparent that only one layer in five is glass cloth. The specification reveals that the glass fibers are for reinforcement, though it would appear that a few would likely be in friction contact with a mating member. Again asbestos is by-and-large the friction fiber. Later U.S. Pat. No. 3,526,306, L. O. Bentz, issued Sept. 1, 1970, shows glass fibers 13 used in the apex of the chevron for reinforcement and away from the wear surface. The specification indicates that fabric 11 can be made of asbestos fibers alone or mixtures with other fibers such as cotton, wool, rayon, linen or jute. Fine metal wires 12 are used with fabric 11. Again, asbestos fibers provide the main friction fiber.

From an inspection of the prior art it does not appear that it occurred to anyone to eliminate asbestos fibers in the actual friction facing. It would appear that their presence was safely sacred, even if other fibers such as glass fibers had to be relied upon for spin reinforcement.

Applicants have discovered that continuous glass fibers not only lend strength superior to asbestos fibers when formed into a friction material such as clutch facings, but have desirable frictional characteristics as well. This invention is concerned with preparing continuous glass fibers for such use.

In the use of asbestos fibers for clutch facing material, it is conventional to twist relatively short (i.e. staple) asbestos fibers with nonferrous wires like copper, brass or zinc together and impregnate the twisted strands with a friction cement. The wires primarily serve as a carrier for the asbestos fibers during processing, though they provide friction and define means for frictional heat transfer when formed into a friction facing. The asbestos fibers generally fall within a random pattern intertwisted with the wire. The wires meander throughout the clutch facing, but follow a generally spiral path.

According to the present invention continuous parallel glass fibers (untwisted) are first impregnated with cement, partially dried, and then helically wrapped by filament such as brass wires to hold them in a continuous bundle. Impregnation occurs prior to wrapping when the fibers are more easily infiltrated by the cement. The fibers in the bundle lie generally parallel with one another, even after spiral winding into disc form.

BRIEF SUMMARY OF THE INVENTION

It is an object of this invention to provide a product for use in forming friction clutch facings.

It is a further object of this invention to provide a continuous bundle of fiber glass rovings for use in forming friction clutch facings.

It is another object of this invention to disclose a process of forming a continuous bundle of fiber glass rovings for use in forming friction clutch facings.

BRIEF DESCRIPTION OF THE DRAWINGS

The invention will be more fully understood and further objects and advantages thereof will become apparent when reference is made to the following detailed description of the preferred embodiment of the invention and the accompanying drawing in which:

FIG. 1 represents the process by which plural glass rovings of continuous glass filaments are processed into a continuous bundle according to this invention;

FIG. 2 is a cross-sectional view taken along line 2—2 of FIG. 1;

FIG. 3 is a cross-sectional view taken along line 3—3 of FIG. 1;

FIG. 4 is a slightly enlarged plan view of a spin table mechanism for helically applying a wire filament around plural rovings to define a bundle;

FIG. 5 is a cross-sectional view taken across the bundle along lines 5—5 of FIG. 1;

FIG. 6 is a substantially full size representation of a section of continuous bundle;

FIG. 7 represents a mold on which continuous bundle of fiber glass strands are wrapped for forming into disc-like clutch facings prior to final processing; and, FIG. 8 represents a finished clutch facing in which the continuous bundles have been used.

Referring to the drawings, and in particular to FIG. 1, there is illustrated a process by which continuous rovings from packages of fiber glass are processed into a continuous bundle for use in clutch facings.

The process of drawing heat softened glass into continuous filaments is well known in the art. Only brief description is made herein, primarily to define terminology. Individual glass filaments in groups of from 200–800 are drawn from the bottom of heated bushings or pots into which is fed molten glass. The filaments for the requirements of the present invention range in diameter from 12–14 microns. The 200–800 filaments are collected together to define a strand. In subsequent operation from 10–120 strands are collected to define a roving. The roving is collected in a hollow cylindrical package to a size of 8–10 inches in diameter by about 10 inches long and weighing some 15–30 pounds. The roving, which forms the package, is of continuous length and is adapted to be drawn from the package for processing according to this invention. To summarize, the following definitions are established:

One strand=200–800 individual continuous ECK glass filaments each having a diameter in the range of about 12–14 microns. (1 micron=.00003937″)

One roving=10–120 strands.

One bundle=6–8 rovings held together in continuous form, e.g., by helically applied brass wires.

Package=Continuous roving wound into a cylindrically shaped package and adapted for subsequent removal therefrom.

Continuous=Generally uninterrupted for a considerable length (e.g., several thousand feet).

In FIG. 1, plural packages of roving, generally identified by the numerals 10, are maintained in a position so that rovings 12 are adapted to be pulled or unwound therefrom. These rovings pass through a comb-like device 14 where they are maintained slightly spaced apart as they pass around roller 16 in cement bath 18. This spacing provides an opportunity for the cement to penetrate more easily to all fibers of each roving. Cement 18 is maintained in quantity and depth in tank 20 to insure thorough impregnation of each roving by the time it passes upwardly therefrom toward eyelet 22. The opening of eyelet 22 is somewhat larger than the combined bulk of the plural rovings 12 passing therethrough and acts to wipe off excess cement which falls back into tank 20. The composition of cement 18 will be disclosed later in this specification. The plural rovings 12, which were brought together at eyelet 22, are again separated as they pass through respective individual openings in rosette disc 24. Any remaining excess cement is wiped from the strands individually as they pass therethrough.

The plural rovings (now separated) pass upwardly through an upstanding drying tower 26 having a chamber where steam is admitted for driving off volatile hydrocarbon parts of cement 18. Steam at about 335° F. is admitted through port 28 to the tower chamber and exhausted through port 30 at about 275° F. Steam is preferred in tower 26 for mixing with the most volatile parts of the cement so as to reduce danger of fire or explosion. These fumes are discharged along with the steam.

The partially dried rovings pass from the top of tower 26, over a pulley arrangement 32, 34 into the top of a second tower 36. As the rovings pass downwardly therethrough, the cement is further exposed to hot air at 350–400° F. which is admitted at middle port 38 and exhausted through upper port 40 and lower port 42. The rovings pass through both towers 26, 36 as individual rovings and do not normally become attached together by the cement. At the entrance to tower 26 they are maintained separately by the rosette and the cement becomes progressively drier as the rovings progress through the towers. The rovings do not normally adhere together, but no substantial disadvantage results if they do.

Cement 18 may be comprised of many formulations common in friction clutch manufacture. Applicants identify the following as one cement found successful for use to impregnate the glass rovings: Rubber 30–40 percent; accelerator and curing agent, such as DOTG, (di-o-tolylguanidine) 20–30 percent; resin 15–30 percent; and, filler 20–30 percent.

Rovings 12 pass downwardly from the bottom of tower 36 through winding apparatus, identified generally by the numeral 60, where filaments, such as brass wire, are helically wound around the several rovings to retain them in a bundle. The helically wound bundle 49 is thereafter wound onto a spool 50 which is rotated slowly by motor 52 driving through a gear reduction (not shown) and friction rolls 54 and 56. The roll 56 bears against the surface of strands 49 being wound onto the drum so as to drive the periphery thereof at a constant linear speed of about 10–20 feet per minute. By the winding action of spool 50, the entire continuous rovings are drawn through the process just described.

Winding apparatus 60 (also see FIG. 4) comprises essentially a revolving disc-like platform 62 carrying plural spools 66 of filament, such as brass wire, in orbit about plural roving 12 for helically wrapping them into a continuous bundle 49. As shown in FIG. 4, platform 62 has an axial opening 63 which permits rovings 12 to pass vertically therethrough. A motor 64, driving through a worm gear arrangement or other gear reduction box (not shown), revolves platform 62 at a rate to helically lay brass wire or other filaments around the several rovings at the desired advance or pitch. This holds the rovings in substantially continuous bundle, a portion of which is illustrated at approximately full scale in FIG. 6. Spools 66 each carry brass wire 68 having a diameter of around .007 inch. The spools are preferably located at different heights, respectively, from the upper face of platform 62. This permits the wires therefrom to be wound onto the bundle at spaced helices as illustrated in FIG. 6. The wire will comprise about 2–4 percent of the weight of the bundle. The helical wrapping may be made with materials other than brass, for example, zinc, other metals and alloys, rayon, nylon and other synthetics. Even glass filaments may be used. The main purpose of the helical wrapping is to retain the continuous bundle. Metallic filaments, of course, have an advantage of rapid heat transfer within a friction material.

Platform 62 is rotatably mounted in housing 70 as shown in FIGS. 1 and 4. The housing protects the revolving parts from outside interference and also defines a guard for protecting workmen.

When spool 50 has collected the desired amount of continuous bundle 49, the bundle is severed and the full spool removed. The continuous bundle is then started on an empty spool and wound thereon as before.

The continuous bundle 49, in its rope-like form, is adapted to be removed from spool 50 in subsequent operations and formed into clutch facings. This step involves feeding the bundle onto a form 72 as shown in FIG. 7. The continuous bundle 49 is wrapped spirally upon itself to form a disc-like shape 74 in a semi-dry condition—some solvent having been driven from cement-impregnated rovings 12 in towers 26, 36. The disc-like form 74 is subsequently removed from form 72 and cured for several hours under high pressure and heat. Thereafter the cured form is trimmed to the desired diameter and machined to the correct thickness to define a clutch facing 76, see FIG. 8. Holes 78 are drilled and countersunk to provide means for securing the facing to a metal disc.

The application of wires 68 to rovings 12 hold the rovings in a bundle for ease in subsequent handling and forming onto form 72. The wires also provide from about 2-4 percent by weight of the friction material in the facing. This provides the desired frictional surface and defines means for heat transfer from the actual surface which comes into contact with a frictional driving member to the interior of the material.

We have disclosed a product for use in forming clutch facings. Obviously, deviations may be made from the disclosure herein still within the spirit of our invention which is limited only by the scope of the claims.

The disclosure herein has been made to a clutch facing. Other than for the requirement of spin strength, there is similarity in the requirements for a clutch and brake friction material. Obviously, the product defined herein, and the process of its manufacture, are applicable to a material for either frictional braking or driving.

What is claimed is:

1. A process of preparing a continuous wrapped bundle of plural rovings of continuous glass filaments for subsequent use in making friction materials which comprises:
   (a) producing a plurality of individual strands of glass by collecting 200-800 individual glass filaments each of 12-14 microns diameter to form each of said strands;
   (b) collecting 10-120 of said strands to form each of said rovings;
   (c) passing a plurality of said rovings into an impregnating bath of a heat curable cement consisting essentially of:

|   | Percent |
   |---|---|
   | Rubber and rubber additives | 50-70 |
   | Resin | 15-30 |
   | Filler | 20-30 | and therein thoroughly impregnating each of said rovings with said cement;
   (d) heating said impregnated rovings in the presence of steam at a temperature in the range of about 275°–335° F.;
   (e) subsequently heating said impregnated rovings at at temperature in the range of about 350°–400° F. in the presence of air;
   (f) bringing said plural rovings together in substantial parallel and closely adjacent relationship to form a bundle; and
   (g) thereafter wrapping around said bundle at least one helix of a continuous nonferrous metal wire selected from the group consisting of brass, copper, and zinc to retain said rovings in a continuous bundle.

2. The process defined in claim 1 wherein the wire is brass.

References Cited
UNITED STATES PATENTS

| | | | |
|---|---|---|---|
| 3,498,038 | 3/1970 | Shulver | 161—176 X |
| 2,293,918 | 8/1942 | Planiol | 161—47 X |
| 3,644,866 | 2/1972 | Deardurff | 156—166 X |
| 3,556,844 | 1/1971 | Marzocchi | 161—93 X |
| 3,676,287 | 7/1972 | Flautt et al. | 161—93 X |

GEORGE F. LESMES, Primary Examiner

P. THIBODEAU, Assistant Examiner

U.S. Cl. X.R.

117—126 GB, 126 GQ; 156—338, 169; 161—175, 176, 93; 192—107 R

UNITED STATES PATENT OFFICE
CERTIFICATE OF CORRECTION

Patent No. 3,756,910　　　　　　Dated September 4, 1973

Inventor(s) Walter B. Peters and Irvin Barnett

It is certified that error appears in the above-identified patent and that said Letters Patent are hereby corrected as shown below:

Column 1, line 33, "Wood" should read --Good--.
Column 6, line 12, "at at" should read - at a -

Signed and sealed this 17th day of September 1974.

(SEAL)
Attest:

McCOY M. GIBSON JR.　　　　　　C. MARSHALL DANN
Attesting Officer　　　　　　　　Commissioner of Patents